(12) United States Patent
Kurpinski et al.

(10) Patent No.: US 8,093,987 B2
(45) Date of Patent: Jan. 10, 2012

(54) VEHICLE ELECTRONIC KEY SYSTEM (75) Inventors: Christopher Kurpinski, Berkley, MI (US); Thomas Keeling, Plymouth, MI (US); Michael Wiegand, Birmingham, MI (US); Justin McBride, West Bloomfield, MI (US); Keiichi Aoyama, Anjo (JP); Tanemichi Chiba, Novi, MI (US)

(73) Assignee: DENSO International America, Inc., Southfield, MI (US)

( * ) Notice: Subject to any disclaimer, the term of this patent is extended or adjusted under 35 U.S.C. 154(b) by 845 days.

(21) Appl. No.: 11/362,586

(22) Filed: Feb. 24, 2006

(65) Prior Publication Data
US 2007/0200668 A1 Aug. 30, 2007

(51) Int. Cl.
G05B 19/00 (2006.01)
G05B 23/00 (2006.01)
G06F 7/00 (2006.01)
G06F 7/04 (2006.01)
G06K 19/00 (2006.01)
G08B 29/00 (2006.01)
G08C 19/00 (2006.01)
H04B 1/00 (2006.01)
H04B 3/00 (2006.01)
H04Q 1/00 (2006.01)
H04Q 9/00 (2006.01)
B60R 25/10 (2006.01)

(52) U.S. Cl. .................. 340/5.64; 340/426.15
(58) Field of Classification Search ............ 340/426.13, 340/5.64, 426.15, 5.72
See application file for complete search history.

(56) References Cited

U.S. PATENT DOCUMENTS

| | | | | |
|---|---|---|---|---|
| 5,495,224 | A * | 2/1996 | Adar | 340/426.26 |
| 6,847,288 | B1 * | 1/2005 | Baschnagel, III | 340/426.1 |
| 6,886,382 | B1 * | 5/2005 | St. Felix | 70/432 |
| 7,420,291 | B2 * | 9/2008 | Sakai | 307/10.2 |
| 2004/0075532 | A1 * | 4/2004 | Ueda et al. | 340/5.72 |
| 2004/0119628 | A1 * | 6/2004 | Kumazaki et al. | 341/176 |
| 2006/0224290 | A1 * | 10/2006 | Nakashima et al. | 701/49 |

* cited by examiner

Primary Examiner — Benjamin C Lee
Assistant Examiner — Cal Eustaquio
(74) Attorney, Agent, or Firm — Harness, Dickey & Pierce, PLC (57) ABSTRACT An electronic key system utilizes a single switch or sensor to perform multiple functions. The function of the single switch or sensor is changed based upon a condition of a component of the vehicle when a controller verifies the presence of a mobile unit. An indicator is utilized to tell an individual what the function of the switch screen is currently.

18 Claims, 6 Drawing Sheets

VEHICLE ELECTRONIC KEY SYSTEM

FIELD

The present invention relates to an electronic key system for a vehicle that changes the function of a component of the vehicle. More particularly, the present invention relates to an electronic key system having a single button whose function can be changed to a door lock button or a door unlock button of a vehicle.

BACKGROUND

The statements in this section merely provide background information related to the present disclosure and may not constitute prior art.

Door locking and unlocking systems for vehicles include the traditional key systems where a key is inserted into a door lock and rotation of the key will lock and/or unlock the door. In order to add convenience for the user, door locking and unlocking systems were developed using a wireless communication between a mobile device typically called a key FOB and the vehicle. The key FOB typically has a door lock button and a door unlock button for locking and unlocking the vehicle door from a predetermined distance from the door when the user pushes one of the two buttons.

More advanced systems include a mobile unit or key FOB having an electronic key. The key FOB can be retained in a user's pocket or purse and the key FOB and the vehicle establish wireless communication with each other when the person with the key FOB comes within a predetermined distance from the vehicle. The vehicle checks the ID code of the key FOB and once the ID code is verified, the vehicle automatically activates sensors which will open the door when a user's hand is sensed.

While the prior art door locking and unlocking systems have provided convenience for the user, development of these systems continue in an effort to provide simplified and fool proof systems that let the user know the status of the door locking/unlocking system.

SUMMARY

The present invention provides the art with a door locking/unlocking system where a function of a component of the vehicle is changed in order and the user is notified of the current status or function of the component. The change in function can be, but is not limited to, the changing of the function of a button between an unlock button and a lock button. An indicator telling the user the correct function of the component can be, but is not limited to, a colored light indicator, the folding/unfolding of a retractable side view mirror; and/or the tinting/clearing of one or more of the window glass of the vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION OF THE DISCLOSURE

The following description is merely exemplary in nature and is not intended to limit the present disclosure, application, or uses. It should be understood that throughout the drawings, corresponding reference numerals indicate like or corresponding parts and features.

Figure 1:
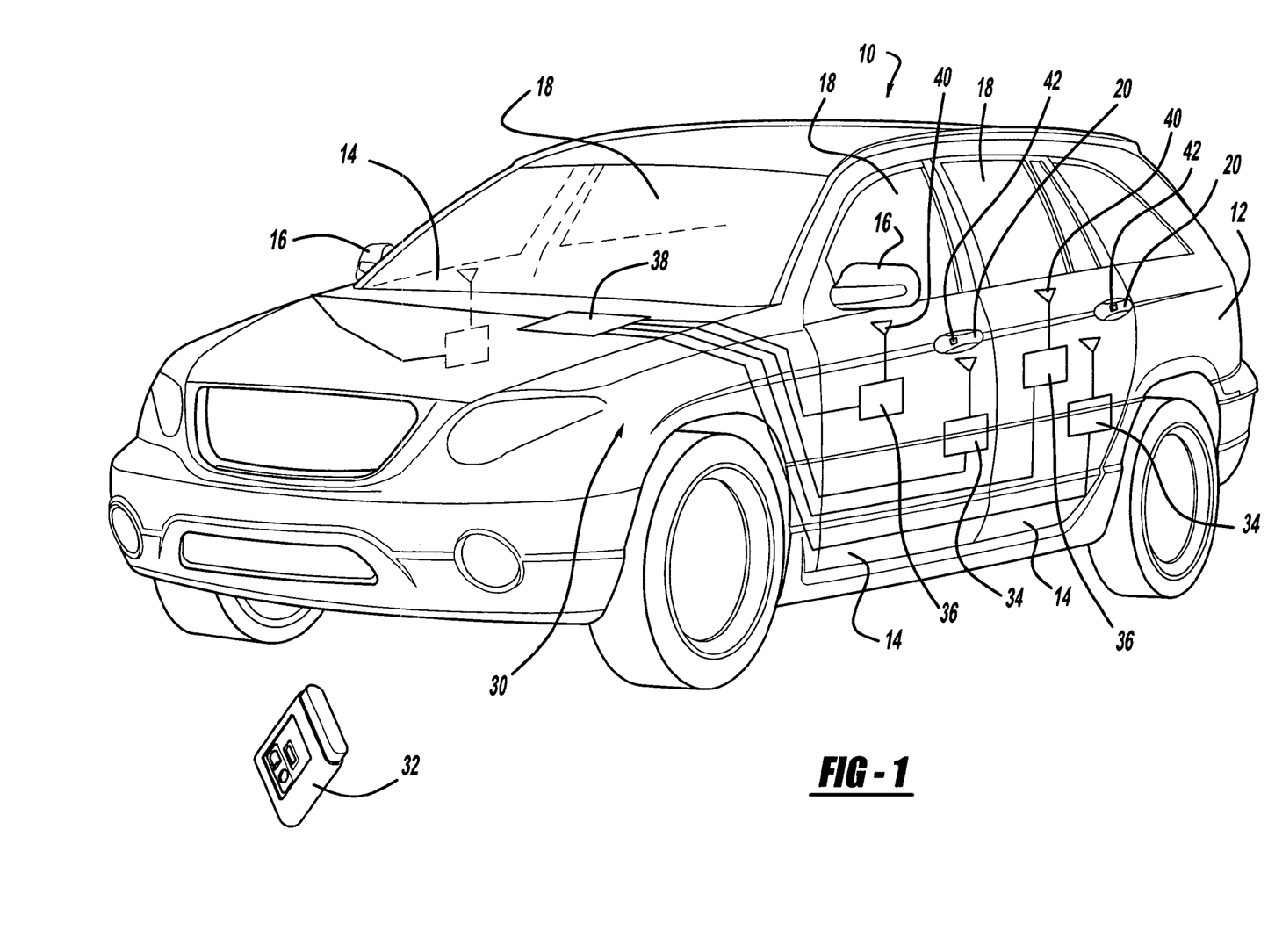
FIG. 1 is a perspective view of a vehicle having a door locking/unlocking system in accordance with the present invention.

There is illustrated in FIG. 1 a vehicle which incorporates a door locking/unlocking system in accordance with the present invention and which is designated generally by the reference numeral 10.

Vehicle 10 comprises a body 12 having a plurality of doors 14, a pair of rear view mirrors 16, a plurality of windows 18 and a plurality of door handles 20 with each door handle being associated with a respective door 14.

Vehicle 10 is equipped with a door locking/unlocking system 30 which comprises a mobile unit or key FOB 32; a door lock 34 associated with each door 14, a controller or vehicle ECU 36 associated with each door 14 and a system controller or vehicle ECU 38. Door locking/unlocking system 30 is capable of placing a single door 14 or a plurality of doors 14 into an unlock standby if the doors 14 are locked or into a lock standby if the doors 14 are unlocked. While door locking/unlocking system 30 is capable of independently controlling all of doors 14, door locking/unlocking system 30 will be described in relation to a single door 14. It is to be understood that all doors 14 can be controlled in an individual manner or that control of a single door 14, such as a driver's door, can also be used to control the other doors 14 in a similar manner. To accomplish automatic placement of door locking/unlocking system 30 into one of these standby modes, the user, possessing key FOB 32 also known as a transponder or electronic key, must walk within a specific radio frequency communication range of vehicle 10 so that communication can be made with one or more antennas 40 which communicate with each respective controller 36 which in turn communicate with controller 38. The user can then touch a sensor or switch 42 associated with each door 14 to perform the specific function.

Figure 2:
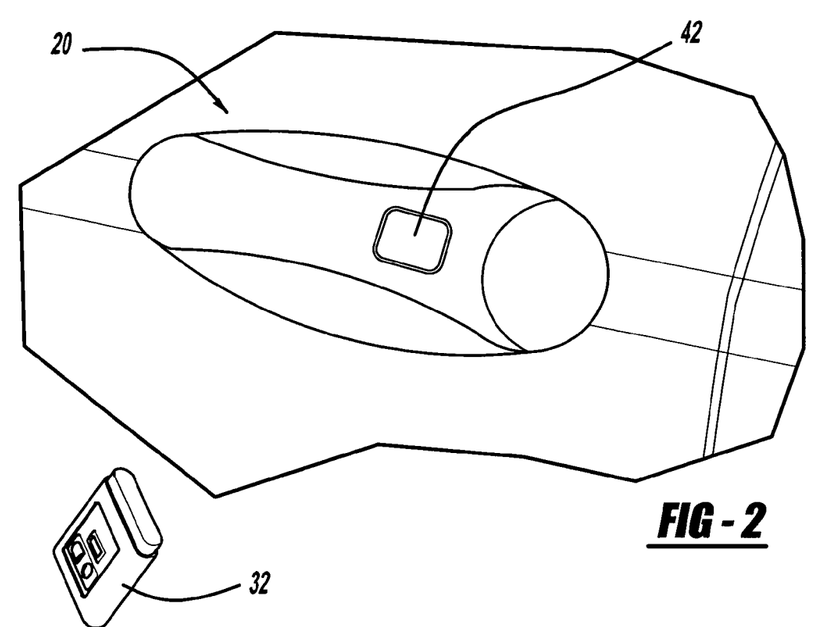
FIG. 2 is a perspective view of a door handle of the vehicle shown with the door locking/unlocking system being in an OFF mode.
Figure 3:
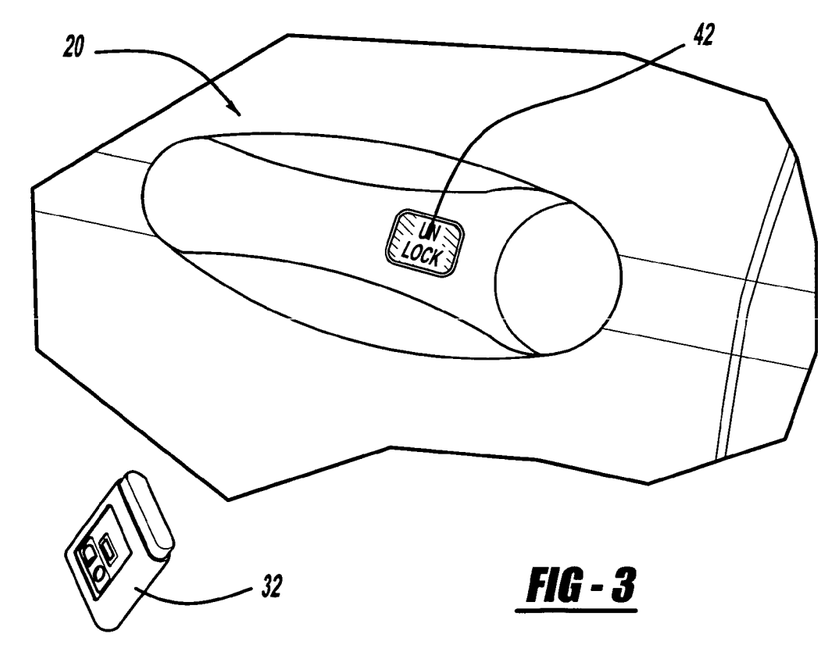
FIG. 3 is a view similar to FIG. 2 but with the door locking/unlocking system being in an UNLOCK mode.
Figure 4:
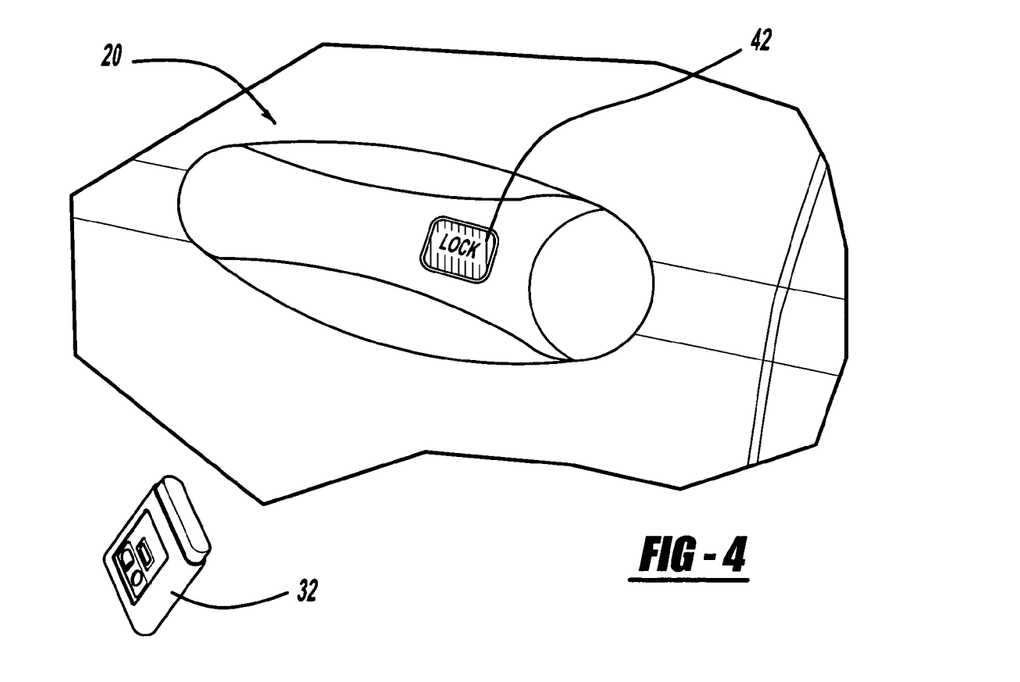
FIG. 4 is a view similar to FIG. 2 but with the door locking/unlocking system being in a LOCK mode.

More specifically, with reference to FIGS. 1-4, when controllers 36 and/or 38 transmit a signal to key FOB 32, key FOB 32 transmits a code signal or ID code. The ID code of key FOB 32 is verified by comparing the ID code to memorized codes. Once verified, controllers 36 and/or 38 determine if the specific door 14 is locked or unlocked. If door 14 is locked, controllers 36 and/or 38 change the respective door handle 20 from an OFF mode as illustrated in FIG. 2 to an UNLOCK mode as illustrated in FIG. 3. In the UNLOCK mode, sensor or switch 42 is illuminated using a green light, the word "UNLOCK" or something similar can be illuminated by the green light and the function of sensor or switch 42 is changed to an unlocking sensor or switch 42. The green light and/or the term "UNLOCK" tells the user that door 14 is currently locked and that the function of sensor or switch 42 is that of an unlocking sensor or switch and that by engaging sensor or switch 42, door 14 will unlock. On the other hand, if door 14 is unlocked, controllers 36 and/or 38 change the respective door handle 20 from the OFF mode as illustrated in FIG. 2 to the LOCK mode illustrated in FIG. 4. In the LOCK mode, sensor or switch 42 is illuminated using a red light, the word "LOCK" or something similar can be illuminated by the red light and the function of sensor or switch 42 is changed to a locking sensor or switch 42. The red light and/or the term "LOCK" tells the user that door 14 is currently unlocked and that the function of sensor or switch 42 is that of a locking sensor or switch and by engaging sensor or switch 42, door 14 will lock. Once door 14 is confirmed as being unlocked, door 14 can be opened by any of the means known in the art.

Once the person with key FOB 32 in their possession is located within the passenger compartment of vehicle 10, door locking/unlocking system 30 defaults to the OFF mode as illustrated in FIG. 2. At this time, the doors 14 can be locked, unlocked or left in their current states. In addition, once the sensor with key FOB 32 leaves the communication area or when key FOB 32 remains in the communication area for an extended period of time, door locking/unlocking system 30 can lock doors 14, unlock doors 14 or leave doors 14 in their current state. This will permit the auto locking of doors 14 when the person leaves the communication area of vehicle 10 or when key FOB 32 remains in the communication area of vehicle 10 for an extended time such as when key FOB 32 is inside the house while vehicle 10 is in the driveway or garage in communication range with key FOB 32.

By utilizing a single sensor or switch 42' and changing its color to indicate the function of sensor or switch 42 based on the current status of door 14, the system is simplified by reducing the complexity of multiple sensors or switches and wiring for the multiple sensors or switches.

Figure 5:
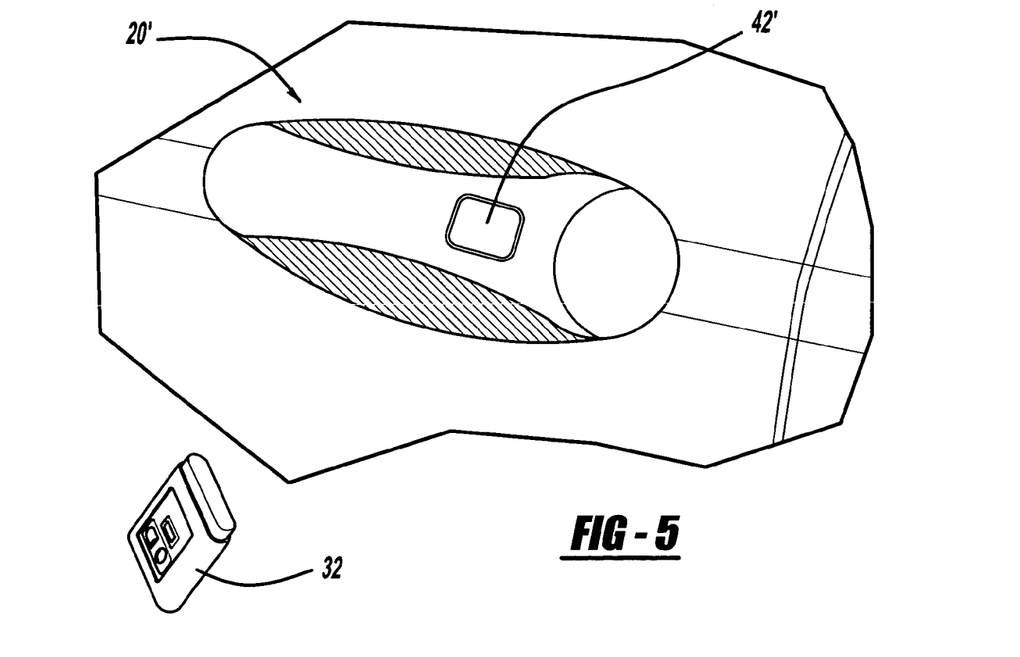
FIG. 5 is a view similar to FIG. 2 but illustrating a door locking/unlocking system in accordance with another embodiment of the present invention in an UNLOCK mode.
Figure 6:
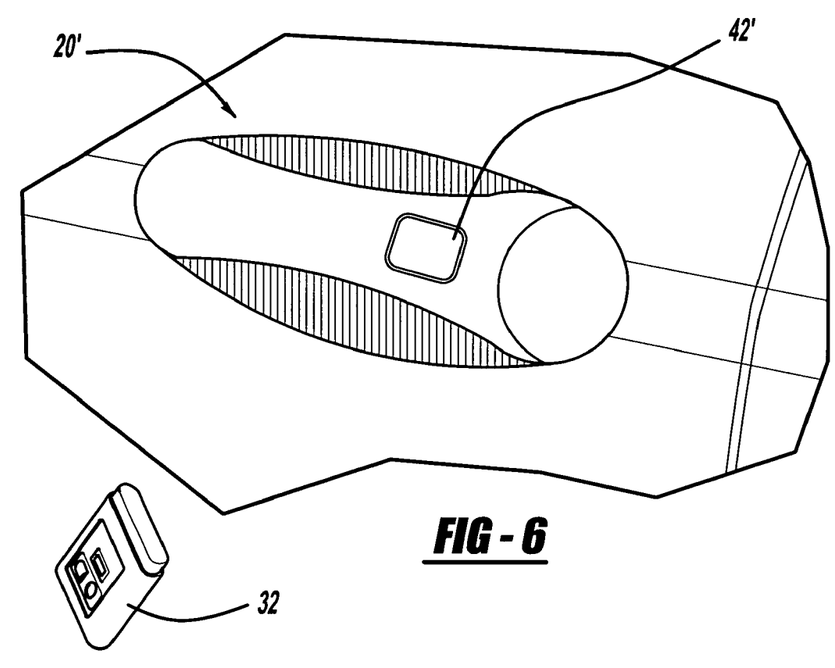
FIG. 6 is a view similar to FIG. 5 illustrating the door locking/unlocking system illustrated in FIG. 5 in a LOCK mode.

Referring now to FIGS. 5 and 6, a door handle 20' in accordance with another embodiment of the present invention is illustrated. Door handle 20' is the same as door handle 20 except that door handle 20' has sensor or switch 42' instead of sensor 42. Sensor or switch 42' is the same as sensor or switch 42 except that it does not include the green light or the red light. Instead, the area beneath door handle 20' is illuminated using a green light when sensor or switch 42' is in the UNLOCK mode as shown in FIG. 5 and the area beneath door handle 20' is illuminated using a red light when sensor or switch 42' is in the LOCK mode as shown in FIG. 6. While the area beneath door handle 20' is illustrated in FIGS. 5 and 6 as being illuminated to show the function of sensor or switch 42', it is within the scope of the present invention to provide the colored illumination at other portions of vehicle 10 which may be determined as being convenient to indicate the function of sensor or switch 42'.

Once the person with key FOB 32 in their possession is located within the passenger compartment of vehicle 10, door locking/unlocking system 30 defaults to the OFF mode as illustrated in FIG. 2. At this time, the doors 14 can be locked, unlocked or left in their current states. In addition, once the sensor with key FOB 32 leaves the communication area or when key FOB 32 remains in the communication area for an extended period of time, door locking/unlocking system 30 can lock doors 14, unlock doors 14 or leave doors 14 in their current state. This will permit the auto locking of doors 14 when the person leaves the communication area of vehicle 10 or when key FOB 32 remains in the communication area of vehicle 10 for an extended time such as when key FOB 32 is inside the house while vehicle 10 is in the driveway or garage in communication range with key FOB 32.

Figure 7:
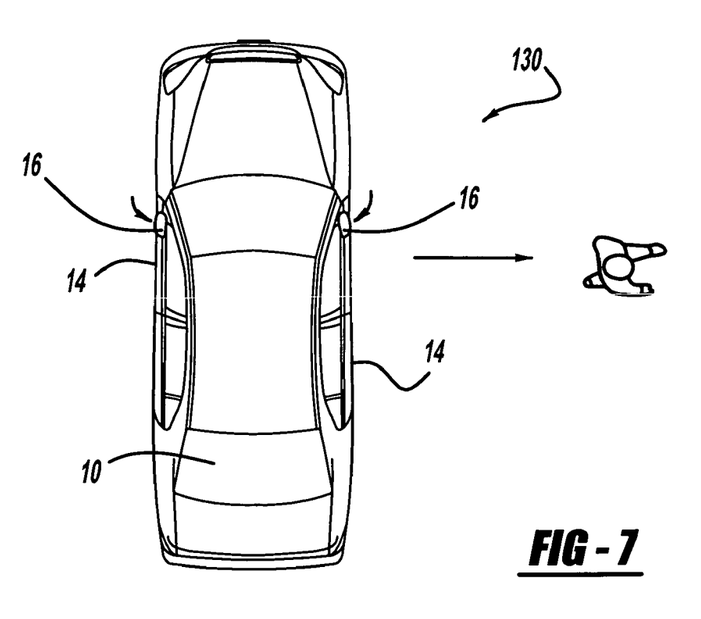
FIG. 7 is a perspective view of a vehicle incorporating a door locking/unlocking system in accordance with another embodiment of the present invention in an UNLOCK mode.
Figure 8:
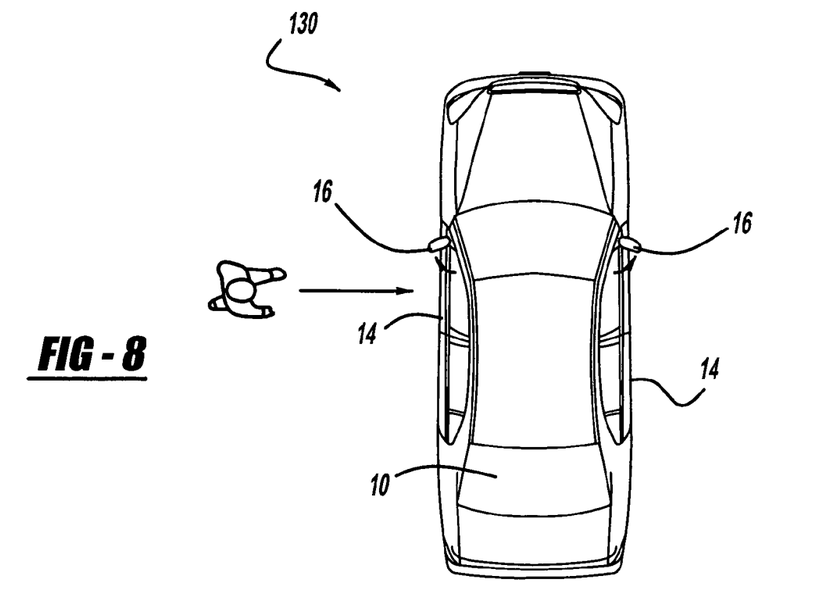
FIG. 8 is a view similar to FIG. 7 illustrating the door locking/unlocking system illustrated in FIG. 7 in a LOCK mode.

Referring now to FIGS. 7 and 8, a door locking/unlocking system 130 in accordance with another embodiment of the present invention is illustrated. Door locking/unlocking system 130 is capable of placing a single door 14 or a plurality of doors 14 into an unlock standby if the doors 14 are locked or into a lock standby if the doors 14 are unlocked. While door locking/unlocking system 130 is capable of independently controlling all of doors 14, door locking/unlocking system 130 will be described in relation to a single door 14. It is to be understood that all doors 14 can be controlled in an individual manner or that control of a single door 14, such as a driver's door, can also be used to control the other doors 14 in a similar manner. To accomplish automatic placement of door locking/unlocking system 130 into one of these standby modes, the user, possessing key FOB 32 also known as a transponder or electronic key, must walk within a specific radio frequency communication range of vehicle 10 so that communication can be made with the one or more antennas 40 which communicate with each respective controller 36 which in turn communicate with controller 38. The user can then touch a sensor or switch 42' associated with each door 14 to perform the specific function.

More specifically, with reference to FIGS. 7 and 8, when controllers 36 and/or 38 transmit a signal to key FOB 32, key FOB 32 transmits a code signal or ID code. The ID code of key FOB 32 is verified by comparing the ID code to memorized codes. Once verified, controllers 36 and/or 38 determine if the specific door 14 is locked or unlocked. FIG. 7 illustrates the physical condition or folded position of rear view mirrors 16 when door 14 is locked or capable of being locked. In this position, rear view mirrors 16 function as an indicator for the current function of sensor or switch 42'. FIG. 8 illustrates the physical condition or unfolded position of rear view mirrors 16 when door 14 is unlocked or is capable of being unlocked. In this position, rear view mirrors 16 function as an indicator for the current function of sensor or switch 42' as well as performing their normal function as rear view mirrors. If door 14 is locked and a person with key FOB 32 comes within the communication range of vehicle 10, controllers 36 and/or 38 change the position of rear view mirrors 16 from the folded position illustrated in FIG. 7 to the unfolded position illustrated in FIG. 8. The user who is approaching vehicle 10 with key FOB 32 will see the movement of rear view mirrors 16 and will know that door 14 is currently locked and that the function of sensor or switch 42' is that of an unlocking sensor or switch and that by engaging sensor or switch 42', door 14 will unlock. On the other hand, if door 14 is unlocked, controllers 36 and/or 38 will leave the position of rear view mirrors 16 at their unfolded position. The user who is approaching vehicle 10 with key FOB 32 will see no movement of rear view mirrors 16 and will know that door 14 is currently unlocked and that the function of sensor or switch 42' is that of a locking sensor or switch and that by engaging sensor or switch 42', door 14 will lock. Another option when door 14 is unlocked, is to have controllers 36 and/or 38 change the position of rear view mirrors 16 from the unfolded position, FIG. 8, to the folded position, FIG. 9. The user who is approaching vehicle 10 with key FOB 32 will see the movement of rear view mirrors 16 and will know that door 14 is currently unlocked and that the function of sensor or switch 42' is that of a locking sensor or switch and that by engaging sensor or switch 42', door 14 will lock. This option provides a visual indication to the user in case he or she missed the movement of rear view mirrors 16. Upon reaching vehicle 10 with key FOB 32, if rear view mirrors 16 are folded as shown in FIG. 7, door 14 is unlocked and sensor or switch 42' will lock door 14. If rear view mirrors 16 are unfolded as shown in FIG. 8, door 14 is locked and sensor or switch 42' will unlock door 14.

Once the person with key FOB 32 in their possession is located within the passenger compartment of vehicle 10, door locking/unlocking system 130 defaults to the unfolded position as shown in FIG. 8. In addition, once the remains in the communication area outside vehicle 10 for an extended period of time, door locking/unlocking system 130 can lock door 14 and fold rear view mirrors 16, it can unlock door 14 and unfold rear view mirrors 16 or it can leave door 14 and rear view mirrors 16 in their current position. This will permit the auto locking feature for door 14 when the person leaves the communication area of vehicle 10 or when key FOB 32 remains in the communication area of vehicle 10 for an extended time such as when key FOB 32 is inside the house while vehicle 10 is in the driveway or garage in communication range with key FOB 32.

By utilizing a single sensor or switch 42' and changing the physical state and function of rear view mirrors 16 between folded and unfolded based on the current status of door 14, the system is simplified by reducing the complexity of multiple sensors or switches and wiring for the multiple switches or sensors.

Figure 9:
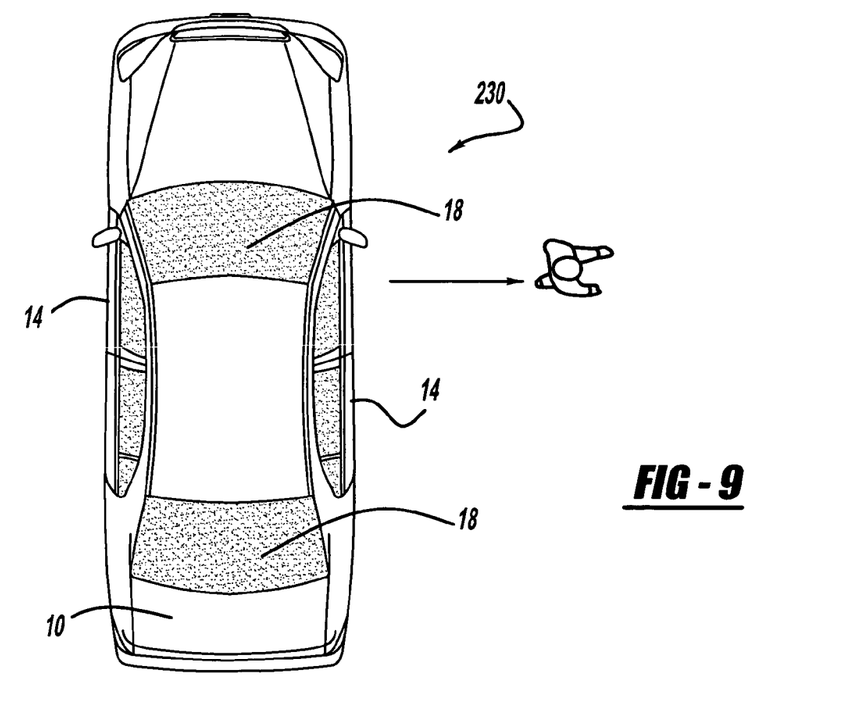
FIG. 9 is a perspective view of a vehicle incorporating a door locking/unlocking system in accordance with another embodiment of the present invention in an UNLOCK mode.
Figure 10:
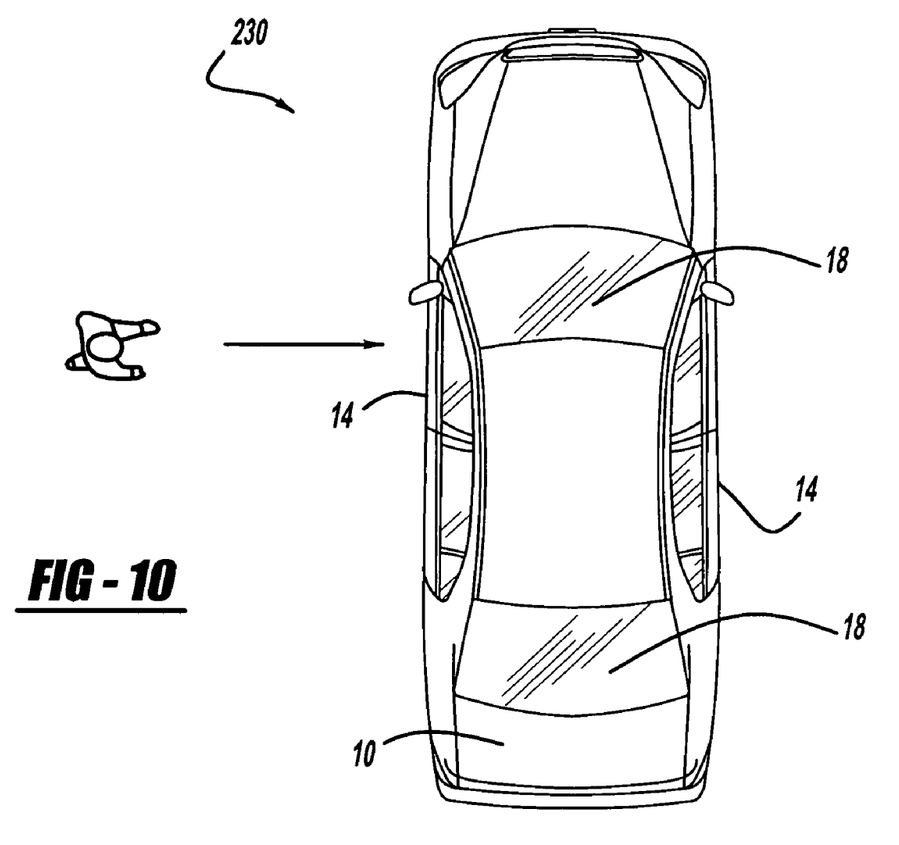
FIG. 10 is a perspective view similar to FIG. 9 illustrating the door locking/unlocking system illustrated in FIG. 9 in a LOCK mode.

Referring now to FIGS. 9 and 10, a door locking/unlocking system 230 in accordance with another embodiment of the present invention is illustrated. Door locking/unlocking system 230 is capable of placing a single door 14 or a plurality of doors 14 into an unlock standby if the doors 14 are locked or into a lock standby if the doors 14 are unlocked. While door locking/unlocking system 230 is capable of independently controlling all of doors 14, door locking/unlocking system 230 will be described in relation to a single door 14. It is to be understood that all doors 14 can be controlled in an independent manner or that control of a single door 14, such as a driver's door, can also be used to control the other doors 14 in a similar manner. To accomplish automatic placement of door locking/unlocking system 230 into one of these standby modes, the user, possessing key FOB 32 also known as a transponder or electronic key, must walk within a specific radio frequency communication range of vehicle 10 so that communication can be made with the one or more antennas which communicate with each respective controller 36 which in turn communicate with controller 38. The user can then touch a sensor or switch 42' associated with each door 14 to perform the specific function.

More specifically, with reference to FIGS. 9 and 10, when controllers 36 and/or 38 transmit a signal to key FOB 32, key FOB 32 transmits a code signal or an ID code. The ID code of key FOB 32 is verified by comparing the ID code to memorized codes. Once verified, controllers 36 and/or 38 determine if the specific door 14 is locked or unlocked. FIG. 9 illustrates the physical condition or darkened state of windows 18 when door 14 is locked or is capable of being locked. In the darkened state, windows 18 function as a security device to prohibit viewing inside vehicle 10 as well as functioning as an indicator for the current function of switch 42'. FIG. 10 illustrates the physical condition or lightened state of windows 18 when door 14 is unlocked or is capable of being unlocked. In the lightened position, windows 18 function as an indicator for the current function of sensor or switch 42' as well as performing the normal function in vehicle 10. If door 14 is locked and a person with key FOB 32 comes within the communication range of vehicle 10, controllers 36 and/or 38 change the state of windows 18 from the darkened state illustrated in FIG. 9 to the lightened state illustrated in FIG. 10. The user who is approaching vehicle 10 with key FOB 32 will see the lightening of windows 18 and will know that door 14 is currently locked and that the function of sensor or switch 42' is that of an unlocking switch or sensor and that by engaging sensor or switch 42', door 14 will unlock. On the other hand, if door 14 is unlocked, controllers 36 and/or 38 will leave the state of windows 18 in their lightened state. The user who is approaching vehicle 10 will see no change of windows 18 and will know that door 14 is currently unlocked and that the function of sensor or switch 42' is that of a locking sensor or switch and that by engaging sensor or switch 42', door 14 will lock. Another option when door 14 is unlocked, is to have controllers 36 and/or 38 darken windows 18 and then optionally lighten windows 18. The user who is approaching vehicle 10 with key FOB 32 will see the changing of windows 18 and will know that door 14 is currently unlocked and that the function of sensor or switch 42' is that of a locking sensor or switch and that by engaging sensor or switch 42', door 14 will lock. This option provides a visual indication to the user in case he or she missed the changing of the physical state of windows 18. Upon reaching vehicle 10 with key FOB 32, if windows 18 are darkened as shown in FIG. 9, door 14 is unlocked and sensor or switch 42' will lock door 14. If windows 18 are lightened as shown in FIG. 10, door 14 is locked and sensor or switch 42' will unlock door 14. The option of lightening windows after darkening them when door 14 is locked may be advantageous to a user who wants windows 18 lightened after reaching and before entering vehicle 10. The timing for lightening windows 18 after darkening them can be chosen to give the user the opportunity to know that doors 14 are unlocked.

Once the person with key FOB 32 in their possession is located within the passenger compartment of vehicle 10, door locking/unlocking system 230 defaults to the lightened state of windows 18 shown in FIG. 10. In addition, once the person with key FOB 32 leaves the communication area or when key FOB 32 remains in the communication area outside vehicle 10 for an extended period of time, door locking/unlocking system 230 can lock door 14 and darken windows 18, it can unlock door 14 and lighten windows 18, or it can leave door 14 and windows 18 in their current state. This will permit the auto locking feature for doors 14 when the person leaves the communication area of vehicle 10 or when key FOB 32 remains in the communication area of vehicle 10 for an extended time such as when key FOB 32 is inside the house while vehicle 10 is in the driveway or garage in communication range with key FOB 32.

By utilizing a single sensor or switch 42' and changing the physical state of windows 18 between darkened and lightened based on the current status of door 14, the system is simplified by reducing the complexity of multiple switches and wiring for multiple switches.

What is claimed is:

1. An electronic key system for a vehicle, the electronic key system comprising:
   a mobile unit located outside of the vehicle;
   a transmitter that transmits a signal to the mobile unit located outside of the vehicle;
   a receiver that receives a code signal from the mobile unit in response to the signal transmitted by the transmitter, when the mobile unit is located outside of the vehicle and within a specified range of the transmitter;
   a controller that verifies the code signal by comparing the code signal to a memorized signal, the controller changing a function of a component of the vehicle upon verification of the code signal; and
   an indicator for indicating the function of the component as an indicated function after verification of the code signal, wherein the component is a switch and the function of the switch is changed between a door unlocking switch and a door locking switch, the switch being engageable with a user to invoke the indicated function, wherein the controller switches the function of the component to a lock function to lock a door of the vehicle in response to the mobile unit remaining outside of the vehicle and within the specified range of the transmitter for a specified period of time without a user engaging the component or the mobile unit.

2. The electronic key system according to claim 1, wherein the indicator is a color of the switch.

3. The electronic key system according to claim 1, wherein the indicator is a color of an illuminated portion of the vehicle.

4. The electronic key system according to claim 1, wherein the indicator is a position of a mirror of the vehicle.

5. The electronic key system according to claim 1, wherein the indicator is a color of a window of the vehicle.

6. The electronic key system according to claim 1, wherein the indicator is a color of the component.

7. The electronic key system according to claim 1, wherein the indicator is a color of an illuminated portion of the vehicle.

8. The electronic key system according to claim 1, wherein the indicator is a position of a mirror of the vehicle.

9. The electronic key system according to claim 1, wherein the indicator is a color of a window of the vehicle.

10. The electronic key system according to claim 1, wherein:
    the indicator is a color of the switch, and
    the switch displays the function of the switch.

11. The electronic key system according to claim 1, further comprising:
    a door handle attached to the vehicle door, wherein:
    the indicator is a color of a portion of the door beneath the door handle.

12. An electronic key system for a vehicle, the electronic key system comprising:
    a key fob located outside of the vehicle;
    a vehicle ECU that transmits a signal to the key fob located outside of the vehicle;
    a vehicle receiver that receives a code signal from the key fob in response to the signal transmitted by the vehicle ECU, when the key fob is outside of the vehicle and within a specified range of the vehicle ECU;
    a door handle with a single button on a door of the vehicle;
    a controller that verifies the code signal by comparing the code signal to a memorized signal, the controller changing a function of the single button upon verification of the code signal; and
    an indicator indicates the function as an indicated function of the single button after verification of the code signal, wherein the indicator comprises part of the single button, wherein the controller locks the door in response to the key fob remaining outside of the vehicle and within the specified range of the vehicle ECU for a specified period of time without a user engaging the single button or the key fob.

13. The electronic key system according to claim 12, wherein:
    the function of the single button changes between a door unlocking switch and a door locking switch, the single button being engaged to invoke the indicated function.

14. The electronic key system according to claim 13, wherein:
    the indicator further comprises an illuminated written word on the single button to indicate function of the single button.

15. The electronic key system according to claim 14, wherein:
    the indicator further comprises a color of a window of the vehicle; and
    the indicator further comprises a position of a rear view mirror of the vehicle.

16. The electronic key system according to claim 15, further comprising:
    a vehicle door, wherein the indicator further comprises a color of a portion of the door beneath the door handle.

17. An electronic key system for a vehicle, the electronic key system comprising:
    a mobile unit located outside of the vehicle;
    a transmitter that transmits a signal from one antenna to the mobile unit located outside of the vehicle;
    a receiver that receives a code signal from the mobile unit in response to the signal transmitted by the one antenna of the transmitter, when the mobile unit is located outside of the vehicle within a specified range of the one antenna of the transmitter;
    a door handle on a vehicle door, wherein the switch is a single button in the door handle, and an indicator displays the function of the single button in an illuminated written word; and
    a controller that verifies the code signal by comparing the code signal to a memorized signal, the controller changing a function of a switch of the vehicle upon verification of the code signal and controlling said indicator that indicates the function of the switch after verification of the code signal, wherein the function of the switch is changed between a door unlocking switch and a door locking switch, the switch being engageable by a user to invoke the function, and the indicator is a lighted color portion of the switch, wherein the controller locks the vehicle door in response to the mobile unit remaining outside of the vehicle and within the specified range of the one antenna of the transmitter for a specified period of time without a user engaging the switch or the mobile unit.

18. The electronic key system according to claim 17, wherein the single button is illuminated in a first color when the function is a door unlocking switch and a second color when the function is a door locking switch.

* * * * *

UNITED STATES PATENT AND TRADEMARK OFFICE
CERTIFICATE OF CORRECTION

| | | |
|---|---|---|
| PATENT NO. | : 8,093,987 B2 | |
| APPLICATION NO. | : 11/362586 | |
| DATED | : January 10, 2012 | |
| INVENTOR(S) | : Christopher Kurpinski et al. | |

It is certified that error appears in the above-identified patent and that said Letters Patent is hereby corrected as shown below:

Col. 5, line 24, after "the" insert --person with the key FOB 32 leaves the communication area or when the key FOB 32--

Col. 5, line 59, after "antennas" insert --40--

Signed and Sealed this
Twenty-ninth Day of May, 2012

David J. Kappos
*Director of the United States Patent and Trademark Office*